July 27, 1965 S. FISHER 3,197,763

SHAFT ENCODERS

Filed Aug. 28, 1962

Sterling Fisher
INVENTOR

BY Michael P. Breston

ATTORNEY 3,197,763

SHAFT ENCODERS

Sterling Fisher, Sarasota, Fla., assignor to Electro-Mechanical Research, Inc., Sarasota, Fla., a corporation of Connecticut Filed Aug. 28, 1962, Ser. No. 219,914
15 Claims. (Cl. 340—347)

This invention generally relates to shaft position encoders and more particularly to new and improved miniature magnetic shaft position digital encoders for producing coded electric signals representative of discrete positions of a flux emanating member carried by a shaft.

By accurately translating mechanical motion into sets of two-level electric signals which represent the digits of numbers corresponding to discrete positions of a movable member, position encoders have rapidly become a vital link of communication between mechanical apparatus and digital handling systems. Basically, digital shaft position encoders include two main parts: a coded member and a device for reading out the member's code. Either the member or the read-out device can be fixedly keyed to a shaft for rotation therewith.

Several types of magnetic encoders are known. A preferred type of magnetic encoder is disclosed in copending application Serial No. 852,542, filed November 12, 1959, now U.S. Patent No. 3,113,300 and assigned to the same assignee. The magnetic encoder disclosed in the copending application includes a rotatable disk having on an end face thereof one or more concentric coded tracks, each comprising a predetermined number of permanently magnetized areas or spots. The disk is made of magnetic material, preferably of barium ferrite. The disk is permanently spot magnetized in accordance with a binary code or other suitable code. Magnetic flux lines emanate substantially perpendicularly from the face of the disk to saturate a miniature, ferromagnetic, gapless, toroidal core when adjacent to a magnetized spot, thereby preventing the core from switching, in response to an alternating excitation signal applied to a winding on the core, from one of its stable remanent saturation states to an opposite stable remanent saturation state along a substantially square-loop hysteresis curve.

High precision shaft position encoders must be capable of resolving the angular shaft's displacements into as many sets of digits or numbers as possible, each number representing a corresponding shaft position. For example, when only five-digit signals are used, the angular resolution may be $360°/2^5=11.25°$, which is a relatively coarse resolution of the shaft's angular positions. On the other hand, an encoder with a fifteen-digit code affords an angular resolution of $360°/2^{15}=0.011°$, or one part in 32,768. However, a fifteen-digit encoder requires at least fifteen distinct coded tracks.

Heretofore to accommodate, for example, fifteen coded tracks without introducing inter-track cross-talk, which would, of course, prevent an accurate read-out of the cores, required relatively large diameter disks. On the other hand, large diameter disks render the shaft encoders bulky, their moments of inertia relatively large, and their starting torque too high for actuation by typical low-torque-output transducers. One of the main limiting factors heretofore encountered in the making of high-resolution encoders was the width of the readout cores. This limitation is substantially reduced in accordance with this invention.

Accordingly, it is a broad object of the present invention to provide new and improved miniature, high-resolution encoders of the foregoing character.

It is another object of the present invention to provide shaft-position encoders characterized by relatively low inter-track cross-talk, low moments of inertia and low starting torques.

These and other apparent objects of the present invention are accomplished by providing shaft-position, digital encoders which include a coded member having a plurality of magnetic flux emanating areas forming a coded pattern. Each of the areas defines a bi-polar concentration of flux. The pattern comprises groups of areas representative of distinct predetermined positions of the coded member. Core members are mounted adjacent and opposite to the coded member. Each core member is composed at least in part of magnetic material having at least two stable remanent states. Each core member includes a gapless first portion delineating a closed-loop magnetic circuit and a second portion defining an air-gap. The first and second portions share a common leg susceptible of becoming substantially saturated by respective ones of the flux emanating areas dependent upon the relative positions of the core members and the flux emanating areas. The first member and the core members are susceptible of relative displacement whereby the cores' air-gaps become positioned with respect to certain of the areas dependent upon the relative displacements. Flux inducing means and output means are coupled with each of the core members for respectively switching the magnetic material in the core members between their stable remanent states, dependent upon the relative positions of the core members and the coded member, and for providing signals, in response to the flux in the core members, representative of the positions of the coded member relative to the core members.

The features of the invention which are believed to be novel are set forth with particularity in the appended claims. The invention itself, however, both as to its organization and mode of operation, together with further objects and advantages thereof, may best be understood by reference to the following description taken in conjunction with the accompanying drawings in which the same numerals refer to like parts and in which:

FIG. 1 is a side-elevational view, partly in cross-section, of an illustrative embodiment incorporating the teachings of the invention;

FIG. 2 schematically illustrates a simplified binary code pattern for the disk of FIG. 1;

Figure 1:
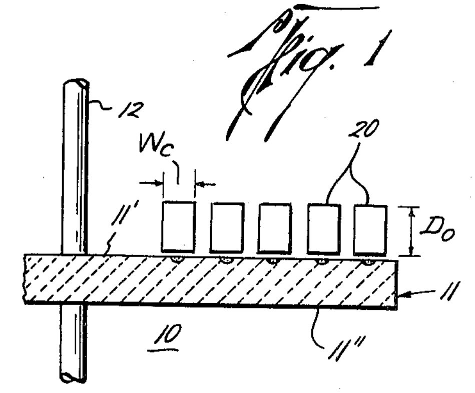

Referring to the drawings, there is shown a digital encoder 10 having at least one coded member 11 fixedly mounted on shaft 12 for rotation therewith. Disk 11 is preferably made of a high coercivity material, an example of which is barium ferrite. Unoriented (i.e., wherein the molecules have not been aligned by a strong field applied to the material during the firing stage) barium ferrite, commercially available under such trade names as Indox No. 1 (manufactured by the Indiana Steel Company) and Ceramag (manufactured by the Stockpole Carbon Company), is a homogenous material, brittle and very hard. The disk may be permanently magnetized by subjecting it to intense, concentrated, magnetic fields in the area to be magnetized, for example, by the use of known recording heads. Thus, each magnetized area hereinafter called a "magnetization" may be considered as defining a concentration of bi-polar flux. That is, it acts as a single bar magnet lying in a plane parallel to the face of the disk.

The linear length of a magnetization may be as small as .005 inch. The spacing between adjacent magnetizations may be on the same order of magnitude as their length. Each area may be randomly polarized in one or the other of two opposite longitudinal directions. As a result, 200 or more discrete magnetizations per linear inch may be provided, thereby permitting a greater resolution than 1/200 of an inch with the encoder of FIG. 1. By suitably controlling the energizing ampere-turns of the recording head, the magnetizations can be confined substantially to the outer layers of disk 11. Thus, both faces of even a relatively thin disk can be permanently magnetized. The obtained magnetizations are very stable, permanent, and do not appreciably demagnetize even when the disk is submitted to relatively high temperature, shock, vibration and external demagnetizing fields.

Preferably then, the employed disk material should have a high retentivity (a high ratio of residual flux density to a maximum flux density) and a high coercivity (a high ratio of coercive force to magnetic field intensity required for saturation); barium ferrite has both of these characteristics. In sum, the main advantages derived from using a high coercivity and a high retentivity material are: to enable permanent, minute magnetization of the face of the disk, to localize the magnetizations to the outer layers of the disk, and to make each magnetization emanate a sufficiently high saturating flux required during the read-out of the disk.

Figure 2:
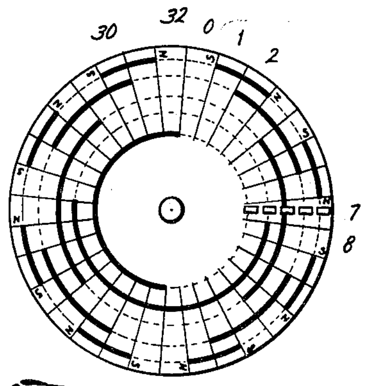

To encode the positions of shaft 12, at least one face of disk 11 is made to carry one or more permanently-magnetized coded concentric rings or tracks. To better explain the coding of each disk, reference is made to FIG. 2. Assume for the moment (to simplify the drawings) that disk 11 is required to provide a five-digit code of the form illustrated, which represents a cyclic ("Gray") code pattern. The circle of the disk would then be divided into thirty-two discrete or quantized sectors. The number of sectors into which the circle is divided is in general $2^n$, where $n$ is the number of digits (rings or tracks) employed. The five rings of FIG. 2 are preferably arranged so that the coarsest (last) ring is the innermost and so on to the first or finest ring, which is the outermost. Each ring or track is segmented into a plurality of magnetized, arcuate segments or areas (represented as dotted arcs) and an equal number of unmagnetized arcuate segments (represented as heavy black arcs). Since the read-out means are responsive to flux rather than to the rate-of-change-of-flux, the spots' polarities, as previously mentioned, may be arranged at random.

In the above illustrated example, only five-digit signals are used to quantize the position of shaft 12. The afforded resolution is only $360°/2^5=11.25°$, which is obviously too coarse for an accurate measurements. A six-digit disk would provide a resolution within a sector of 5.62°, a seven-digit disk within a sector of 2.81°, and a thirteen-digit disk within a sector of 0.044 degrees, which is one part in 8,192. Since it is possible to magnetize both faces of a relatively thin disk, approximately half of the employed rings may be conveniently placed on the opposite face of the disk. For example, in a thirteen-track disk, the first seven outer tracks can be magnetized on face 11' and the remaining six inner tracks on the opposite face 11". The number of rings carried by either face is arbitrary. For convenience the rings are substantially equally divided. It will be appreciated that the inner rings may be placed on face 11" on different diameter circles than those which they would assume on face 11'. To read out the information contained on each face of disk 11, at least one pickup head 20 is mounted in contiguous relation with each track and opposite thereto. A typical spacing between a pickup head and its corresponding track is on the order of a few thousandths of an inch.

Figures 3, 4, 5:
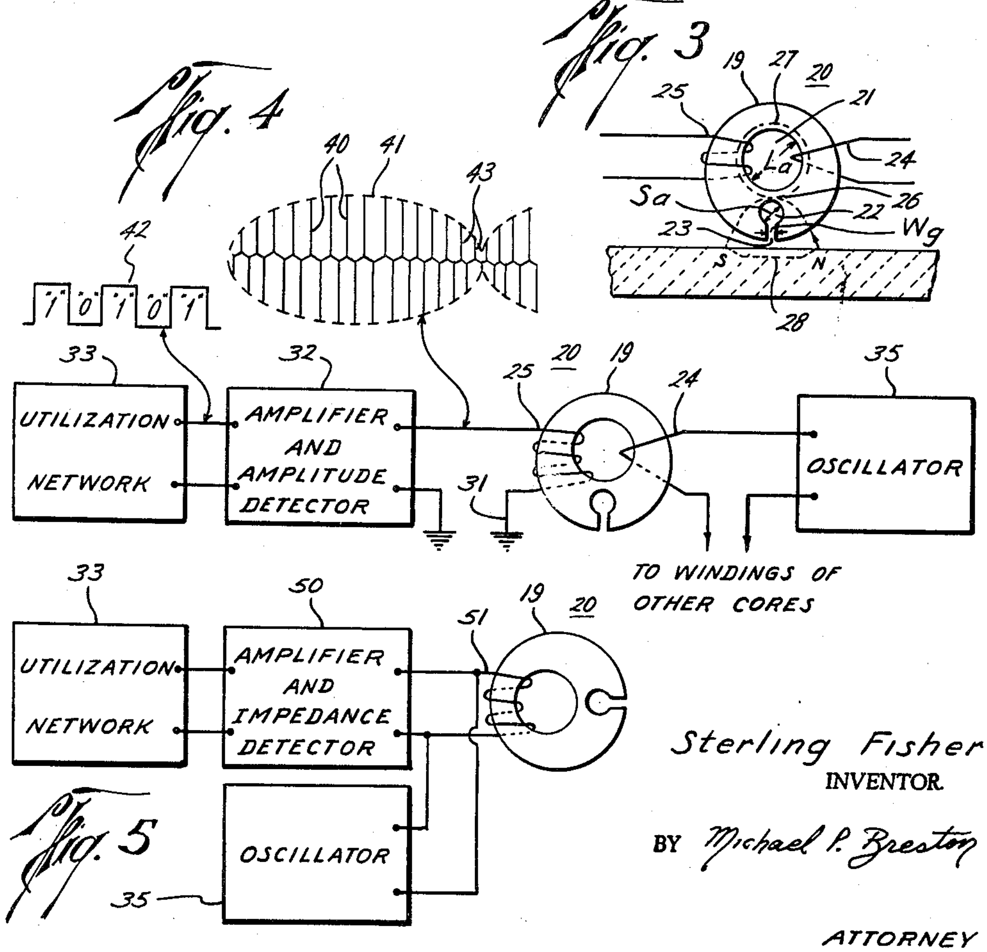
FIG. 3 is an enlarged, fragmentary, side-elevational view of a portion of the embodiment shown in FIG. 1.
FIG. 4 is a block diagram of one type of electric network which may be employed to read-out the encoder of FIG. 1.
FIG. 5 is a block diagram of another type of electric network which may be employed to read-out the encoder of FIG. 1.

As shown in greater detail in FIG. 3, each pickup head 20 comprises a miniature, two-aperture ferrite core 19 having a large aperture 21 and a small aperture 22. Through the thickness of the wall separating the outer edge of core 19 and the small aperture 22 is cut a radial channel or gap 23. Core 19 carries a single or multiple turn interrogating winding 24 and a single or multi-turn output or read-out winding 25.

As shown in FIG. 4, the interrogating windings 24 can be connected in series for energization by a suitable signal source. On the other hand, one lead of each output winding can be connected to a common bus wire 31, which may be grounded, and the other lead of each output winding can be connected for carrying the output information from winding 25 to a suitable utilization device 33 via an amplifier and amplitude detector network 32. In this fashion, all the cores are interrogated in series.

Referring to the illustrated five-digit code encoder shown in FIGURES 1 and 2, the signals induced in each of the output windings 25 on the five radially aligned heads 20 are two-level ON and OFF signals, i.e., binary digits "1's" and "0's." The reference position from which the angles are measured is numbered as the ZERO sector. The rotation of shaft 12, to which code wheel 11 is fixedly secured, may be represented by any desired function of time: the disk may be stationary or rapidly accelerating or decelerating in a clockwise or counterclockwise direction. If the shaft's position is such that the pickup units fall within the seventh sector, the parallel output binary digits which are simultaneously generated are, in cyclic binary ("Gray") terms, "00100." If the displacement of the wheel relative to the pickup heads is such that the next consecutive eighth sector falls under the pickup heads, the digital output would become, in cyclic binary terms, "00110."

A miniature core 19, employed to sense the magnetizations can assume typical dimensions as follows: the core's outside diameter $D_o=.205''$, the core's width $W_c=.025''$, the large aperture's diameter $L_a=0.1''$, the small aperture's diameter $S_a=.04''$, and the width of gap 23 $W_g=.005''$. These dimensions are illustrative only. In some embodiments the core's outside diameter was much less and each of the other dimensions was correspondingly reduced.

The flux emanating from each magnetization is of sufficient strength to saturate leg 26 which is common to the closed-loop magnetic circuit 27 and the open-loop magnetic circuit 28, both represented by dotted lines in FIG. 3. In this application, the term "closed-loop" refers to a magnetic circuit in which the flux is substantially entirely confined to the relatively high permeability ferrite core 19. In contradistinction, an "open-loop" calls for one or more air gaps. Thus magnetic circuit 28 is "open" because the flux therein traverses the air space between the core and the magnetization. Preferaby, each core is made of a substantially "square-loop" type material which is saturable by the flux lines emanating from the smallest magnetization when adjacent and opposite to the core's air gap 23.

The number of turns in the interrogating and output windings depends on the operating conditions, as on the frequency of the interrogating signal, on the magnetic characteristics of the cores, on the magnitude of the desired read-out signals, on the circuits employed for read-out, etc.

As shown in FIG. 4, in a typical preferred operation of the encoder, the interrogate windings 24 are all connected in series and are energized by a single source 35. The output signals 40, induced in the output winding 25 as a result of the change of flux in the closed-loop magnetic circuit 27 from one stable remanent state to the other, may first be amplified, if necessary, and then applied to an amplitude detector 32 which detects the output signals' envelope 41 and provides binary "1" and "0" signals 42 to a utilization device 33, typically to a digital computer system. There is little restriction on the wave shape of the applied interrogate signal. For example, it may be a sine or a square wave. It may even be a pulsating current. As long as the interrogate signal includes alternate positive and negative swings which place the cores in the proper sequence of remanent states, reliable operation is assured.

The operation of each head is as follows: on one hand, when the air gap 23 is adjacent to a non-magnetized area (black arc in FIG. 2), an alternating interrogate signal, when of sufficient amplitude, causes core 19 to alternately switch from one stable remanent state to the other stable remanent state along its "square loop" hysteresis curve. During the switching of a core, pulses 40 of alternate polarity become generated in its output winding 25 due to the change of flux from a positive to a negative remanent state and vice versa. On the other hand, when the core is adjacent to a magnetized area (dotted arc in FIG. 2), the flux lines in the magnetic circuit 28 saturate leg 26. The flux emanating from each magnetization is of sufficient strength to maintain leg 26 saturated even while the interrogate signal changes from one polarity to the other. Thus, during the process of interrogation, each core 19 becomes alternately switched from one stable remanent state to the other except when its gap 23 is immediately adjacent and opposite to a flux emanating area. In the latter case only a relatively small output signal 43 is generated in the read-out winding 25. In yet different words, when air gap 23 is adjacent to a non-magnetized area, pickup head 20 electro-magnetically "transfers" the input signal from the interrogate winding 24 to the read-out winding 25. On the other hand, when air gap 23 is opposite and adjacent to a magnetized area, no transfer of signal occurs from the input to the output winding and, hence, head 20 can be considered as being practically "open-circuited." The frequency of the interrogate signal is not critical, values ranging from 20 to 200 kilocycles and more can be successfully used. It will be appreciated that a read-out may be obtained regardless of whether the coded disk 11 is stationary or moving.

As an alternative to interrogating core 19 with a continuous signal, it may also be interrogated with single cycle pulses applied to the interrogate windings 24. The resulting output pulses from the output windings 25 are then processed in the manner previously described. As in the case of continuous interrogation, when gap 23 "senses" a flux field, leg 26 becomes saturated and, consequently, only a very small output pulse 43 appears in the output winding 25. Inversely, when air gap 23 is not adjacent and opposite to a magnetization, a relatively large output pulse 40 is generated in the output winding 25. However, in this type of operation, core 19 must be returned to its original state of magnetization, in order to always place head 20 in the same remanent state for oncoming successive interrogating pulses. The placing of the core in the proper remanent state can be readily accomplished by mounting on the core a bias winding (not shown), in a known manner, and supplying it with biasing signals in synchronism with the interrogating signals.

Although the operation of the encoder was described in conjunction with an input and an output winding on each core and the binary digits were obtained by detecting the presence or absence of a voltage or current in the output windings, it should be apparent, as shown in FIG. 5, that the encoder can operate with only a single winding 51 on each core 19. In this case, the binary digits can be obtained by monitoring the variations in the impedance of this single winding as, for example, by substituting an impedance detector 50 for the amplitude detector 32.

In this mode of operation, during the interval when the interrogate signal applied to the single winding 51 causes core 19 to switch alternately from one remanent magnetization state to the other, core 19 becomes unsaturated for a short time interval (usually on the order of one microsecond). During the transition between these alternate remanent states, the impedance of winding 51 is relatively high. Conversely, when the core's gap 23 is opposite to a magnetization, leg 26 becomes saturated, no switching between alternate remanent states takes place and, therefore, the impedance of winding 51 remains very low.

However, regardless of whether the voltage or the impedance of output winding 25 is measured, a "0" bit (relatively low voltage, current or impedance) is obtained when leg 26 is saturated and a "1" bit (relatively high voltage, current or impedance) is obtained when leg 26 is unsaturated, i.e., when gap 23 is placed between two consecutive, discrete, magnetized areas on the disk. In sum, the state of saturation of leg 26 determines the quality of the output binary digits from each head 20. Consequently, the magnetized spots, if properly spaced apart, can be of either polarity as long as they are of sufficient strength to substantially saturate leg 26 when gaps 23 are placed opposite thereto. It will now be readily appreciated why in accordance with the invention the positions of shaft 12 can be encoded with much greater accuracy than that heretofore obtainable from similar type encoders. Specifically, the width of the core's gap 23 is relatively much smaller than the width of the core say, for example, ⅛th of the core's width (refer above for typical core dimensions). Because the width of the core is no longer the limiting factor, a much greater number of magnetizations per linear inch can be accommodated in the encoder of the present invention.

Although encoder 10 was specifically described in conjunction with the cyclic Gray code, it should be understood that a "pure" or standard binary code can also be employed. To avoid the existing inherent ambiguity in the read-out of the pure binary code, more than one, typically two, read-out heads per track can be advantageously provided. For example, the first, or least significant, track on face 11′ could have a single core associated therewith whereas the remaining tracks could each have two cores. The read-out heads could be arranged, for example, in accordance with either the "V" or the "U" read-out method. Other read-out techniques could equally be employed.

Having thus described my invention with particular reference to a preferred embodiment thereof, it will be obvious to those skilled in the art to which the invention pertains, after understanding my invention, that various changes and other modifications may be made therein without departing from the spirit and scope of my invention, as defined by the claims appended hereto.

What is claimed is:

1. In a position sensing apparatus, a first member having a plurality of magnetic flux emanating areas arranged in a coded pattern, each of said areas defining a bi-polar concentration of flux, said pattern comprising groups of areas representative of distinct predetermined positions; core members mounted opposite to said first member, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said flux emanating areas dependent upon the relative positions of said core members and said flux emanating areas; said first member and said core members being susceptible of relative displacements whereby said air gaps are positioned with respect to certain of said areas dependent upon said relative displacements; flux inducing means coupled with each of said core members for switching the magnetic material in said core members between said remanent states dependent upon the relative positions of said core members and said first member; and output means responsive to the flux in said core members for providing signals representative of said predetermined positions.

2. In a position sensing apparatus, magnetic flux generating means for providing a plurality of magnetic fields arranged in a predetermined pattern, each of said fields including a bi-polar magnetic flux, said pattern comprising groups of fields representative of distinct predetermined positions; core members mounted opposite to said flux generating means, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said fields dependent upon the relative positions of said core members and said fields; said means and said core members being susceptible of relative displacements whereby said air gaps are positioned with respect to certain of said fields dependent upon said relative displacements; flux inducing means coupled with each of said core members for switching the magnetic material in said core members between said remanent states dependent upon the relative positions of said core members and said flux generating means; and output means responsive to the flux in said core members for providing signals representative of said predetermined positions.

3. In a position sensing apparatus, a first member having a plurality of magnetic flux emanating areas arranged in a coded pattern, each of said areas defining a concentration of bi-polar flux, said pattern comprising groups of areas representative of distinct predetermined positions; core members mounted opposite to said first member, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said flux emanating areas dependent upon the relative positions of said core members and said flux emanating areas; said first member and said core members being susceptible of relative displacements whereby said air gaps are positioned with respect to certain of said areas dependent upon said relative displacements; flux inducing means coupled with each of said core members for switching the magnetic material in said core members between said remanent states dependent upon the relative positions of said core members and said first member; and output means responsive to the flux in said core members for providing signals representative of said predetermined positions.

4. In a position sensing apparatus, magnetic flux generating means for providing a plurality of magnetic fields arranged in a predetermined pattern, each of said fields including a bi-polar magnetic flux, said pattern comprising groups of fields representative of distinct predetermined positions; core members mounted opposite to said flux generating means, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said fields dependent upon the relative positions of said core members and said fields; said means and said core members being susceptible of relative displacements whereby said air gaps are positioned with respect to certain of said fields dependent upon said relative displacements; flux inducing means coupled with each of said core members for switching the magnetic material in said core members between said remanent states dependent upon the relative positions of said core members and said flux generating means; and output means responsive to the flux in said core members for providing signals representative of said predetermined positions.

5. In a position sensing apparatus, a first member having on at least one face thereof a plurality of magnetic flux emanating areas arranged in a coded pattern, each of said areas defining a bi-polar concentration of flux, said pattern comprising groups of areas representative of distinct predetermined positions; core members mounted adjacent to said face but spaced therefrom and being disposed transversely to said face, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said flux emanating areas dependent upon the relative positions of said core members and said flux emanating areas; said first member and said core members being susceptible of relative displacements whereby said air gaps are positioned with respect to certain of said areas dependent upon said relative displacements; flux inducing means coupled with each of said core members for switching the magnetic material in said core members between said remanent states dependent upon the relative positions of said core members and said first member; and output means responsive to the flux in said core members for providing signals representative of said predetermined positions.

6. In a position sensing apparatus, a first member having on at least one face thereof a plurality of magnetic flux emanating areas arranged in a coded pattern, each of said areas defining a concentration of bi-polar flux, said pattern comprising groups of areas representative of distinct predetermined positions, the arrangement of the areas in each group being different from the arrangement of the areas in the remaining groups; core members mounted adjacent to said face but spaced therefrom, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said flux emanating areas dependent upon the relative positions of said core members and said flux emanating areas; said first member and said core members being susceptible of relative displacements whereby said air gaps are positioned with respect to certain of said areas dependent upon said relative displacements; flux inducing means coupled with each of said core members for switching the magnetic material in said core members between said remanent states dependent upon the relative positions of said core members and said first member; and output means responsive to the flux in said core members for providing signals representative of said predetermined positions.

7. In a position sensing apparatus, magnetic flux generating means for providing a plurality of magnetic fields arranged in a predetermined pattern, each of said fields including a bi-polar magnetic flux, said pattern comprising groups of fields representative of distinct predetermined positions; core members disposed adjacent to but spaced from said flux generating means, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said fields dependent upon the relative positions of said core members and said fields; said means and said core members being susceptible of relative displacements whereby said air gaps are positioned with respect to certain of said fields dependent upon said relative displacements; flux inducing means including at least one winding coupled with each of said core members for switching the magnetic material in said core members between said remanent states dependent upon the relative positions of said core members and said means, whereby the impedance of each winding having a relatively high value when its core is intermediate said fields and a relatively low value when it is within one of said fields, and output means responsive to the flux in said core members for providing signals representative of said predetermined positions.

8. In an encoder, a first member having on at least one face thereof a plurality of magnetic flux emanating areas, said face being substantially unmagnetized intermediate said areas, said areas being arranged in a coded pattern, each area defining a concentration of bi-polar flux, said pattern comprising groups of areas representative of distinct predetermined positions; core members mounted adjacent to said face, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said flux emanating areas dependent upon the relative positions of said core members and said flux emanating areas; said first member and said core members being susceptible of relative displacements whereby said core members are positioned with respect to certain of said areas dependent upon said relative displacements; flux inducing means coupled with each of said core members for switching the magnetic material in said core members between said remanent states dependent upon the relative positions of said core members and said first member; and output means responsive to the flux in said core members for providing signals representative of said predetermined positions.

9. In a digital encoder, a first member having on at least one face thereof a plurality of magnetic flux emanating areas, said face being substantially unmagnetized intermediate said areas, said areas being arranged in a coded pattern, each area defining a concentration of bi-polar flux, said pattern comprising spaced tracks of magnetized areas, each track representing a distinct order of a digital code, whereby groups of areas are representative of distinct predetermined positions; core members mounted adjacent to said first member, at least one core for each track, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said flux emanating areas dependent upon the relative positions of said core members and said flux emanating areas; said first member and said core members being susceptible of relative displacements whereby said air gaps are positioned with respect to certain of said areas dependent upon said relative displacements; flux inducing means coupled with each of said core members for switching the magnetic material in said core members between said remanent states dependent upon the relative positions of said core members and said first member; and output means responsive to the flux in said core members for providing signals representative of said predetermined positions.

10. In a digital encoder, a first member having on at least one surface thereof a plurality of magnetic flux emanating areas, said face being substantially unmagnetized intermediate said areas, said areas being arranged in a coded pattern, each area defining a concentration of bi-polar flux, said pattern comprising tracks of magnetized areas, each track representing a distinct order of a digital code, whereby groups of areas are representative of distinct predetermined positions; core members disposed adjacent to said surface and opposite said tracks, at least one core member for each track, each core member being composed at least in part of magnetic material having at least two remanent states and having a gapless first portion for providing a closed-loop magnetic circuit and a second portion defining an air gap, said first and second portions having a common leg being susceptible of becoming substantially saturated by respective ones of said flux emanating areas depending upon the relative positions of said core members and said flux emanating areas; means including a shaft for imparting relative displacements between said first member and said core members whereby said air gaps are positioned with respect to certain of said areas dependent upon said relative displacements; flux inducing means coupled with each of said core members for switching the magnetic material in said core members between said remanent states dependent upon the relative positions of said core members and said first member; and output means responsive to the flux in said core members for providing signals representative of said predetermined positions.

11. The digital encoder of claim 10 wherein said first member is a disk, said tracks are concentric with the axis of said shaft, and said flux inducing means include at least one interrogating winding on each of said core members.

12. The digital encoder of claim 10 wherein said first member is a drum, and said flux inducing means include at least one interrogating winding on each of said core members.

13. The digital encoder of claim 10 wherein said output means include at least one read-out winding on each core member for intercepting the flux in the core, whereby said read-out windings have relatively large amplitude signals induced therein except when said core members are opposite said flux emanating areas.

14. The digital encoder of claim 10 wherein said shaft axially supports and rotates said first member with said surface in closely spaced tangential relation to the periphery of each of said second portion.

15. The digital encoder of claim 10 wherein said flux inducing means include an interrogating winding, said output means include a read-out winding, and said encoder further including biasing means coupled with said core members for selectively controlling the remanent state of the magnetic material in said core members.

References Cited by the Examiner

UNITED STATES PATENTS

| | | | |
|---|---|---|---|
| 2,770,798 | 11/56 | Roth | 340—347 |
| 2,947,929 | 8/60 | Bower | 340—347 |
| 3,016,427 | 1/62 | Grant | 340—174.1 |

MALCOLM A. MORRISON, *Primary Examiner.*